US008447905B2

(12) United States Patent
Ambroladze et al.

(10) Patent No.: US 8,447,905 B2
(45) Date of Patent: May 21, 2013

(54) DYNAMIC MULTI-LEVEL CACHE INCLUDING RESOURCE ACCESS FAIRNESS SCHEME

(75) Inventors: Ekaterina M. Ambroladze, Wappingers Falls, NY (US); Deanna Postles Dunn Berger, Poughkeepsie, NY (US); Diana Lynn Orf, Somerville, MA (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 12/821,739

(22) Filed: Jun. 23, 2010

(65) Prior Publication Data
US 2011/0320659 A1 Dec. 29, 2011

(51) Int. Cl.
*G06F 13/18* (2006.01)
(52) U.S. Cl.
USPC .......................................... 710/240; 710/243
(58) Field of Classification Search
USPC ..................... 710/112–125, 240–244, 200
See application file for complete search history.

(56) References Cited

U.S. PATENT DOCUMENTS

| | | | | |
|---|---|---|---|---|
| 5,239,651 A | * | 8/1993 | Sodos | 710/241 |
| 5,706,446 A | * | 1/1998 | Kalish et al. | 710/113 |
| 6,505,260 B2 | * | 1/2003 | Chin et al. | 710/41 |
| 6,535,941 B1 | * | 3/2003 | Kruse | 710/241 |
| 6,665,760 B1 | * | 12/2003 | Dotson | 710/240 |
| 7,120,714 B2 | * | 10/2006 | O'Connor et al. | 710/243 |
| 2006/0200607 A1 | * | 9/2006 | Subramaniam Ganasan et al. | 710/113 |
| 2006/0236010 A1 | * | 10/2006 | O'Connor et al. | 710/111 |
| 2008/0091866 A1 | * | 4/2008 | Cox et al. | 710/243 |
| 2009/0217280 A1 | | 8/2009 | Miller et al. | |

\* cited by examiner

*Primary Examiner* — Raymond Phan
(74) *Attorney, Agent, or Firm* — Cantor Colburn LLP; John Campbell

(57) ABSTRACT

An apparatus for controlling access to a resource includes a shared pipeline configured to communicate with the resource, a plurality of command queues configured to form instructions for the shared pipeline and an arbiter coupled between the shared pipeline and the plurality of command queues configured to grant access to the shared pipeline to a one of the plurality of command queues based on a first priority scheme in a first operating mode. The apparatus also includes interface logic coupled to the arbiter and configured to determine that contention for access to the resource exists among the plurality of command queues and to cause the arbiter to grant access to the shared pipeline based on a second priority scheme in second operating mode.

15 Claims, 5 Drawing Sheets

DYNAMIC MULTI-LEVEL CACHE INCLUDING RESOURCE ACCESS FAIRNESS SCHEME

BACKGROUND

This invention relates generally to processing within a computing environment, and more particularly to computing systems having a multilevel cache hierarchy.

In computers, a cache is a component that improves performance by transparently storing data such that future requests for that data can be served faster. The data that is stored within a cache might be values that have been computed earlier or duplicates of original values that are stored elsewhere (e.g. main memory). If requested data is contained in the cache (cache hit), this request can be served by simply reading the cache, which is comparably faster. Otherwise (cache miss), the data has to be recomputed or fetched from its original storage location, which is comparably slower.

Cache operations in a shared cache may be performed by accessing a shared pipeline. A pipeline may be considered as a set of data processing elements connected in series, so that the output of one element is the input of the next one. An instruction pipeline may be used in a computing device to increase instruction throughput (the number of instructions that can be executed in a unit of time). The fundamental idea is to split the processing of a computer instruction into a series of independent steps, with storage at the end of each step. This allows the computer's control circuitry to issue instructions at the processing rate of the slowest step, which is much faster than the time needed to perform all steps at once. The term pipeline refers to the fact that each step is carrying data at once (like water), and each step is connected to the next (like the links of a pipe.)

Every new generation of high end processor systems brings a design with an increasing number of requestors that need access to a scarce number of resources. To ensure fair access to these resources, some sort of priority arbitration scheme is used. In terms of cache hierarchy, the access to resources is handled by controlling access to the shared pipeline.

The access to each resource may have its own unique fairness requirements that would lean toward independent priority schemes for each resource. Such an approach is expensive in terms of area and complexity, as it requires many independent pieces of logic. However, at the other extreme, having a single priority scheme for all types of resources, while it is the simplest and most efficient approach may prove to be too unfair for providing access to certain resources.

BRIEF SUMMARY

An embodiment of the present invention is directed to an apparatus for controlling access to a resource. The apparatus of this embodiment includes a shared pipeline configured to communicate with the resource, a plurality of command queues configured to form instructions for the shared pipeline and an arbiter coupled between the shared pipeline and the plurality of command queues. The arbiter is configured to grant access to the shared pipeline to a one of the plurality of command queues based on a first priority scheme in a first operating mode. The apparatus of this embodiment also includes interface logic coupled to the arbiter and configured to determine that contention for access to the resource exists among the plurality of command queues and to cause the arbiter to grant access to the shared pipeline based on a second priority scheme in second operating mode.

Another embodiment of the present invention is directed to a computer implemented method of granting access to a shared pipeline. The method includes operating an arbiter in a first mode according to a first priority scheme; determining that contention exists between at least two requestors for access to a resource; blocking access to the resource; determining that the resource has become available; and operating the arbiter in a second mode according to a second priority scheme, the second priority based on and different from the first priority scheme.

Another embodiment of the present invention is directed to a computer implemented method of granting access to a shared pipeline. The method of this embodiment includes operating an arbiter in a first mode according to a first priority scheme; determining that contention exists between at least two requestors presenting requests for access to a resource, the requests including instructions; blocking access to the resource; determining that the resource has become available; determining if the instructions are in a same group and, if so, resolving the contention based on a group contention resolution scheme, otherwise, resolving the contention based on an inter-group contention resolution scheme.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
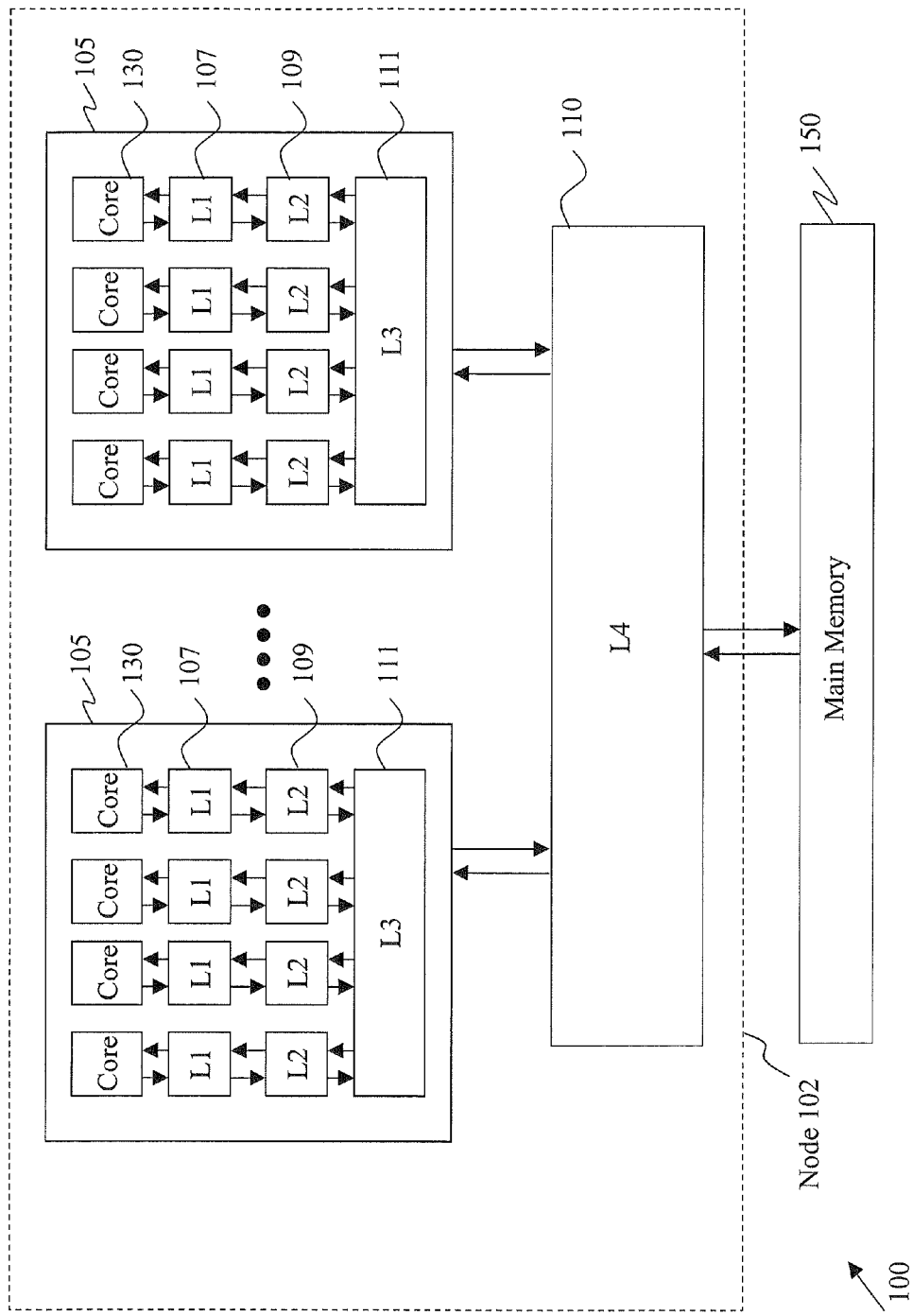
FIG. 1 depicts an example of system on which embodiments of the present invention may be implemented.

FIG. 1 illustrates an example of a computing system 100 according to one embodiment. The system includes one or more nodes 102. In one embodiment, the system 100 may include four nodes 102. In a computing system, multiple nodes 102 may be operatively connected to one another for communicating such as making and responding to requests, as understood by one skilled in the art.

Each node 102 includes one or more central processors 102. In one embodiment, each node 102 includes six central processors 105. The central processors 105 include one or more cores 130 that perform the reading and executing of instructions. In one embodiment, one or more of the central processors 105 include four cores 130. Of course, the central processors 105 could include any number of cores 130 that is greater than or equal to two.

Each core 130 is operatively coupled to its own L1 and L2 cache, 107 and 109 respectively. The L1 caches 107 are physically closest to the cores 130 and the L2 caches 109 are coupled to the L1 caches 107. Each L2 cache 109 in each central processor 105 is coupled to a single L3 cache 111. In this manner, the L3 cache 111 is shared by multiple L2 caches 107.

The node 102 also includes one or more L4 caches 110. The L4 caches 110 are operatively coupled to two or central processors 105. In this manner, the L4 caches 110 are shared by multiple L3 caches 111. The system 100 may also include main memory 150 operatively coupled to the L4 caches 110.

In one embodiment, the L3 caches 111 and L4 cache 110 are formed of embedded dynamic random access memory (DRAM) which is referred to as eDRAM. Of course, it is understood by a skilled artisan that any other types of suitable memory such as DRAM may be utilized. In one embodiment, the L2 caches 109 may be formed of static random access memory (SRAM).

In one embodiment, each individual central processor 105 is fabricated on its own separate chip, which includes the L1, L2, and L3 caches, and the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

In an exemplary embodiment, the L1 caches 107 are between 96 and 128 KB, the L2 caches 109 are 1.5 MB, the L3 cache 111 is 24 MB and the L4 cache 110 is 192 MB. Of course other sizes could be utilized. In FIG. 1, the four different levels of caches (L1, L2, L3 and L4) are shown. Of course, such an organization of caches is exemplary only and the teachings herein may be applied to any situation where multiple requesters have access to a shared cache and the shared cache is one of a plurality of shared caches that have access to another shared cache.

The L3 cache 111 is a departure from prior schemes in that it introduces a shared cache between the L2 109 and L4 110 caches. That is, in the prior art, the L2 caches 109 were coupled directly to the L4 cache 110. Accordingly, in the prior art, the L4 cache 110 was both the point of coherency for the node 102 and the source of its data.

In one embodiment, the L2 cache 109 is a write-through cache. Thus, any change in the L2 cache 109 is immediately updated in the L3 cache 111. The L3 cache 111, on the other hand, is a write back cache. Thus, changes in the L3 cache 111 are not updated to the L4 cache until requested by the L4 cache 110 (e.g., the L4 cache 110 requests that the L3 cache 111 invalidate a line) or the L3 cache 111 is changed such that the line is invalidate (e.g., the L3 cache 111 swaps out the line).

Given that the L3 cache 111 is a write back cache and may source data to L2 caches 109, there are instances where the L4 cache 110 may not include the most up to date data contained in the L3 cache 111. In such instances, to maintain coherency, in the event that the L4 cache 110 receives an access request for data on a particular cache line (or a portion thereof) from main memory 150 it must first query the L3 cache 111 to determine if it has an updated copy of the data and send coherency updates to the lower level caches if the L4 cache 110 requires the L3 cache 111 to change its state with respect to cache line. These requirements may add latency to all requests to the L4 cache 110, which now must go through the extra step of communicating with the L3 cache 111 before responding to a request.

Figure 2:
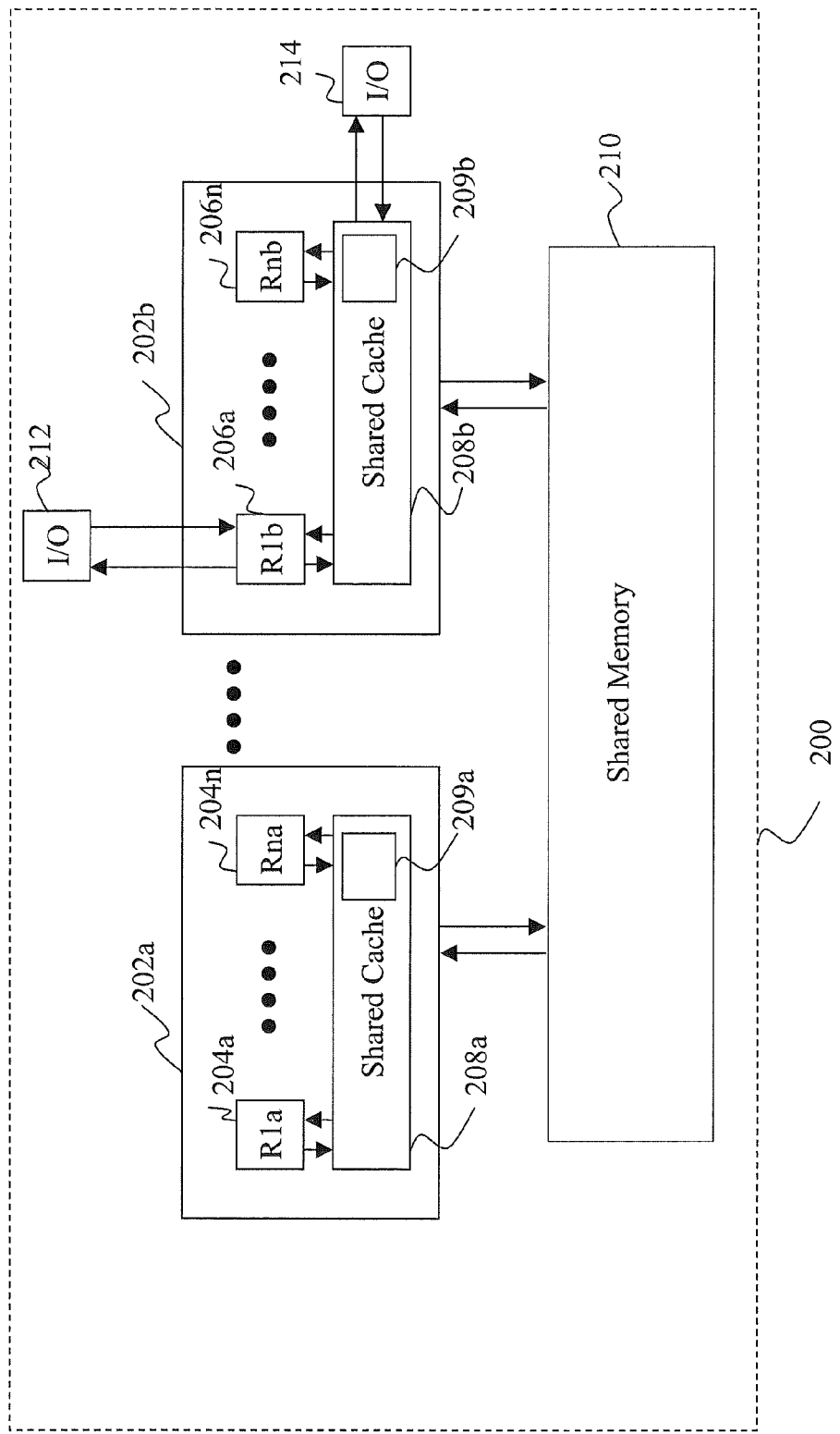
FIG. 2 depicts an alternative embodiment of a system on which embodiments of the present invention may be implemented.

FIG. 2 illustrates an alternative embodiment of a node 200. In this embodiment, the node 200 includes one or more central processors 202a . . . 202b. Each central processor 202 includes a shared cache 208 that includes a shared cache controller 209. The node also includes a shared memory 210 that may be accessed by each of the shared caches 208.

In general, the shared caches 208 receive requests for information (including both data and instruction requests) and if the requested data is contained in the shared caches 208 (cache hit), this request can be served by simply reading the shared cache 208. Otherwise, a cache miss occurs and the data is requested from shared memory 210. The determination of whether a cache hit or miss exists and the general operation of the shared cache 208 is controller by the shared cache controller 209. Of course, any of the caches described herein may include a cache controller.

In one embodiment, the shared cache controller 209 is implemented to include a pipeline and other elements. The shared cache controller 209 may also be responsible for coherency checking. In one embodiment, the shared caches 208 are write back caches.

In more detail, each shared cache 208 is coupled to two or more requesters. For example, shared cache 208a is coupled to requesters 204a . . . 204n and to shared memory 210, all of which may issue requests to the shared cache 208a. For example, shared memory 210 or requestors 204a . . . 204n may request a copy of a particular cache line contained in shared cache 208a. In one embodiment, the requestors 204a . . . 204n are caches. However, the requestors may include other types of device. For example, requestor 206a . . . 206n are coupled to shared cache 208b in central processor 202b. In one embodiment, requestor 206a is an I/O device controller and is coupled to an I/O device 212. The I/O device 212 may be located on a separate chip than central processor 202b. Of course, some I/O devices may include internal drivers and may be directly coupled to the shared cache 208b. One or ordinary skill will realize that other embodiments where a shared cache 208 is coupled to a shared memory 210 and to two or more other requestors, regardless of whether the other requestors are on the same chip as the shared cache, are within the scope of the present invention.

Embodiments of the present invention are directed to creating fair access to a resource via a secondary fairness scheme built on top of a primary arbitration scheme that does not guarantee equitable access to the scarce resource. Utilizing the primary arbitration scheme allows for a high degree of logic reuse and complexity reduction while the secondary fairness scheme ensures that requests get equitable and timely access to the resource.

Figure 3:
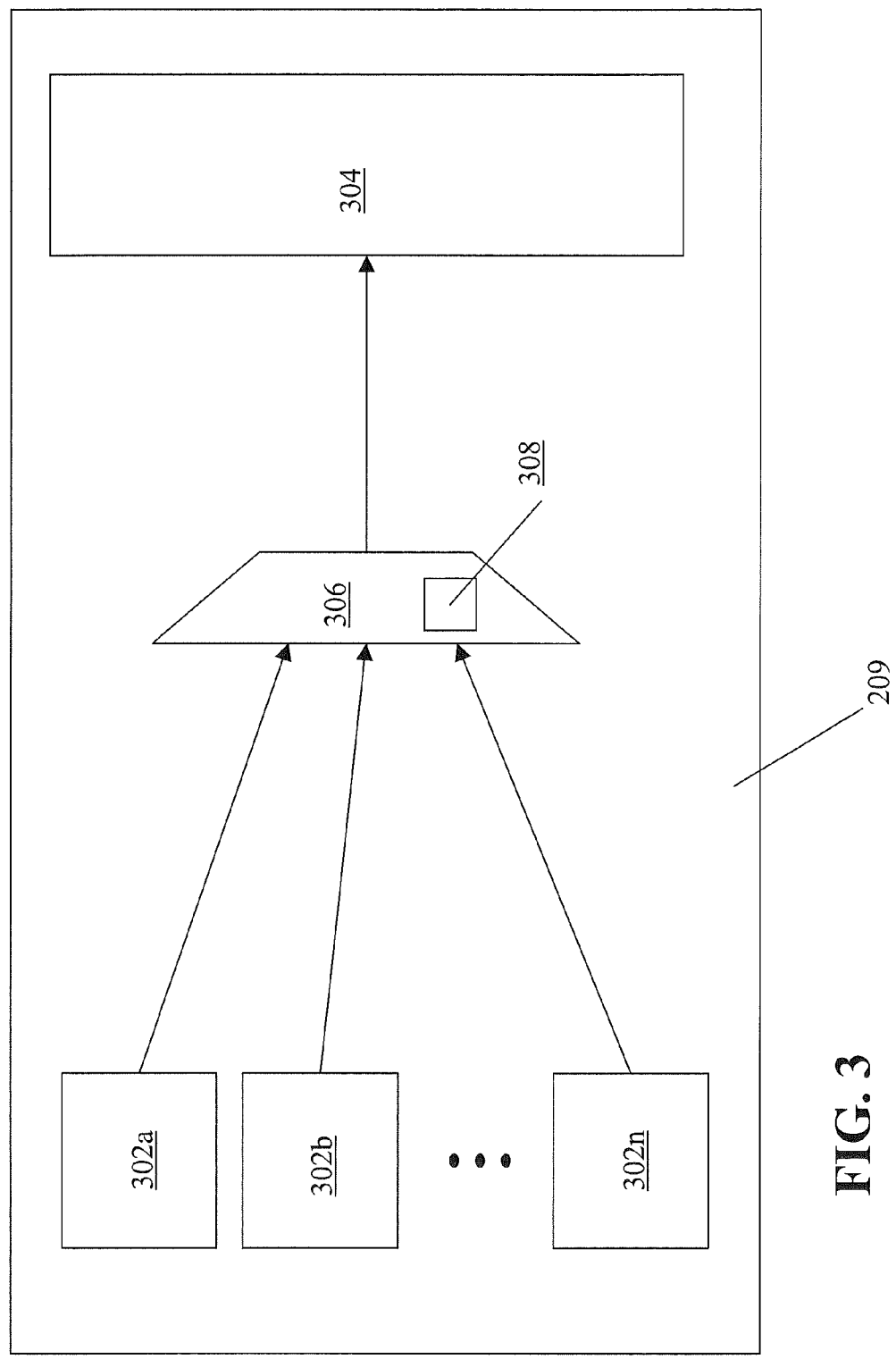
FIG. 3 depicts a cache controller according to one embodiment.

FIG. 3 shows an example of cache controller 209 of a shared cache in one embodiment. The cache controller 209 includes one or more command queues 302a . . . 302n. The command queues 302 are assigned operations received from an external location (e.g., requestors 204 and 206 or shared memory 210 of FIG. 2) or originated on the shared cache on which the cache controller is resident. Regardless of where received from, the command queues 302 process the operation and may produce one or more instructions to be performed by the shared pipeline 304. Each instruction may include a required access to a resource. For example, the instruction may require access to command queue located on another cache or device. The command queues 304 may each have a unique identifier and may be assigned to perform a certain type of operation. The type of operation the command queue performs shall be referred to herein as its command queue type. For example, the command queues 302 may have types that include: an External Device Request type that handles requests from an external device, a Cache Miss type that handles situations where a cache miss has occurred on the shared memory on which the cache controller 209 is located, an I/O Request type that handles requests from an input/output device; and Lower Level Handler type that handles requests from a lower level cache (e.g., closer to the core that the cache controller 209). Of course, this list is merely illustrative and the list could include any number of different types. In general, each type includes requests for access to resources.

In some cases, however, multiple command queues 302 may be producing instructions for the shared pipeline 304 at the same time. Accordingly, the cache controller 209 includes an arbiter 306 that selects instructions to provide to the shared pipeline 304. In normal operation the arbiter 306 utilizes a priority scheme that ranks requests based on command queue type. As it is rank priority, it is inherently unfair to the lower groups of command queues, though the priority logic is simple and small.

In some cases, one or more command queue types may be producing instructions that require access to a scarce resource. An example of a scarce resource includes the limited number of command queues on the L4 cache 110 (FIG. 1). While the following description is related to access to L4 cache command queues by an L3 cache, it shall be understood that the teachings herein may applied in situation where contention for a scarce resource may occur.

Using the rank priority in the arbiter 306 in an unmodified manner would allow lower ranked L3 command queues to be locked out of access to the L4 command queues. Embodiments of the present invention may, therefore, include interface logic 308 that monitors when there is contention for the L4 command queues and blocks access to the instruction that needs the L4 command queues. The interface logic 308 may determine that contention exists by monitoring the number of instructions currently operating that access the L4 command queues. The interface logic 308 may be configured to determine which instructions access the L4 command queues 302 by the mode of the instruction.

When one of the L4 queues becomes available, the interface logic 308 allows the command queues 302 into the pipeline 304 in a staggered, round robin fashion. The round robin ensures that every L3 command queue type gets a fair chance to utilize the L4 queues, while the staggered priority block release minimizes the delay for requests in the case where the round robin points to a queue type with no requests.

Figure 4:
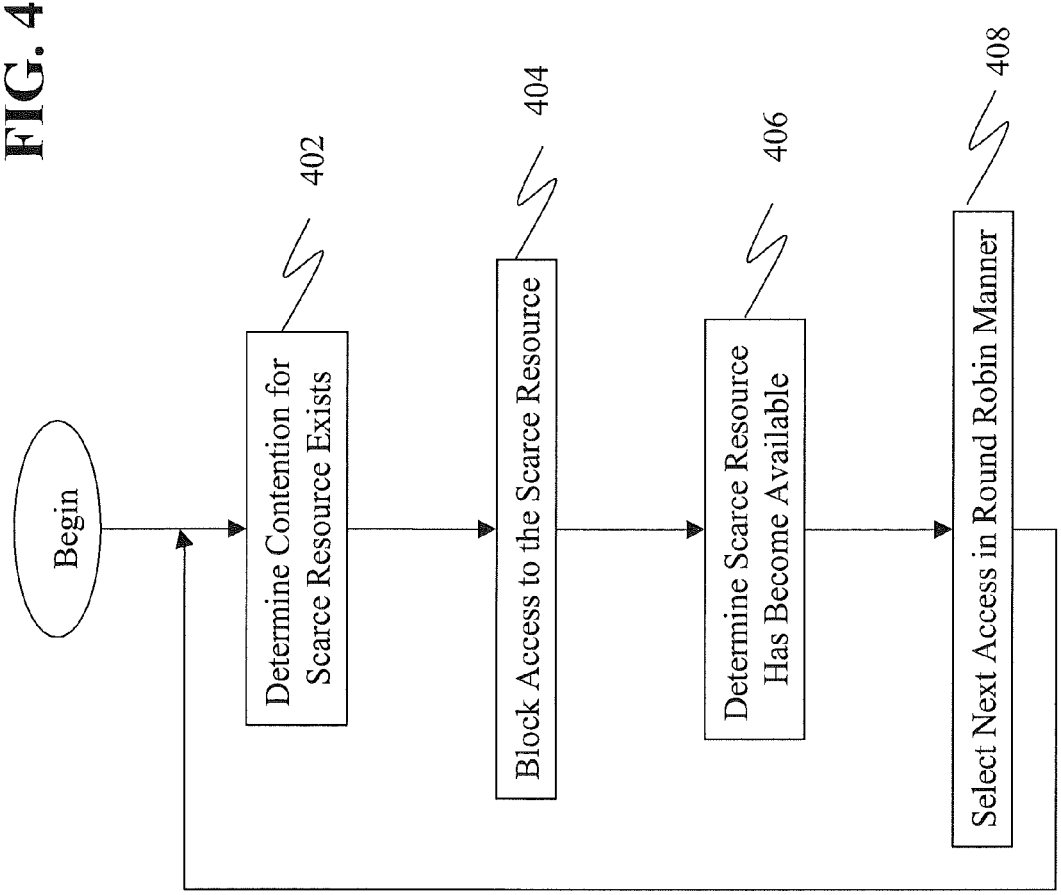
FIG. 4 is a flow chart showing a method of resolving contention between requestors for access to a resource according to one embodiment.

FIG. 4 is flow chart of method according to one embodiment. This method may be performed, for example, by interface logic 308.

At a block 402 it is determined that contention for a scarce resource exists. Until such a time as the contention exists, the arbiter 306 may be free to operate in its typical rank based manner. Of course, such a determination may require that the number and current usage of the scarce resource is known. "Contention" as the term is used herein refers to situation where two or more command queues are requesting access to a single, or the next available, instance of a particular resource.

After determining that contention for the scarce resource exists, assess to the scarce resource is blocked or otherwise disallowed at a block 404. For example, the interface logic 308 may cause the arbiter 306 to disallow any command queue 302 access to the shared pipeline 306 if the command queue is presenting an instruction that requires access to the scarce resource.

At a block 406 it is determined that the scarce resource, or an instance thereof, has become available. Now that the scarce resource is available, the arbiter 306 may provide access to the shared pipeline 304 to one of the command queues 302 presenting an instruction that includes an access to the scarce resource based on the mode of the instruction.

As discussed above, each command queue may include an identification number. The arbiter 306 may include information about the command queue type for each command queue 302 based on this number. The interface logic 308 may keep a round robin portion that includes a list of the command queue types. After block 406, at a block 408, the interface logic 308 may instruct the arbiter to grant access to a command queue 302 that is of the type that is next on the list. If such a type is not presenting an instruction, the interface logic 308 may instruct the arbiter to grant access to a command queue 302 that is of the type that is next on the list. This process may continue until a command queue 302 presenting an instruction that is of the matching type is found. The process then returns to block 402. The next time block 408 is entered, it will first attempt to grant access the type in the list following the type that was last granted access. In such a manner, no one specific type of command queue 302 may starve out other types when there is contention for a scarce resource.

Figure 5:
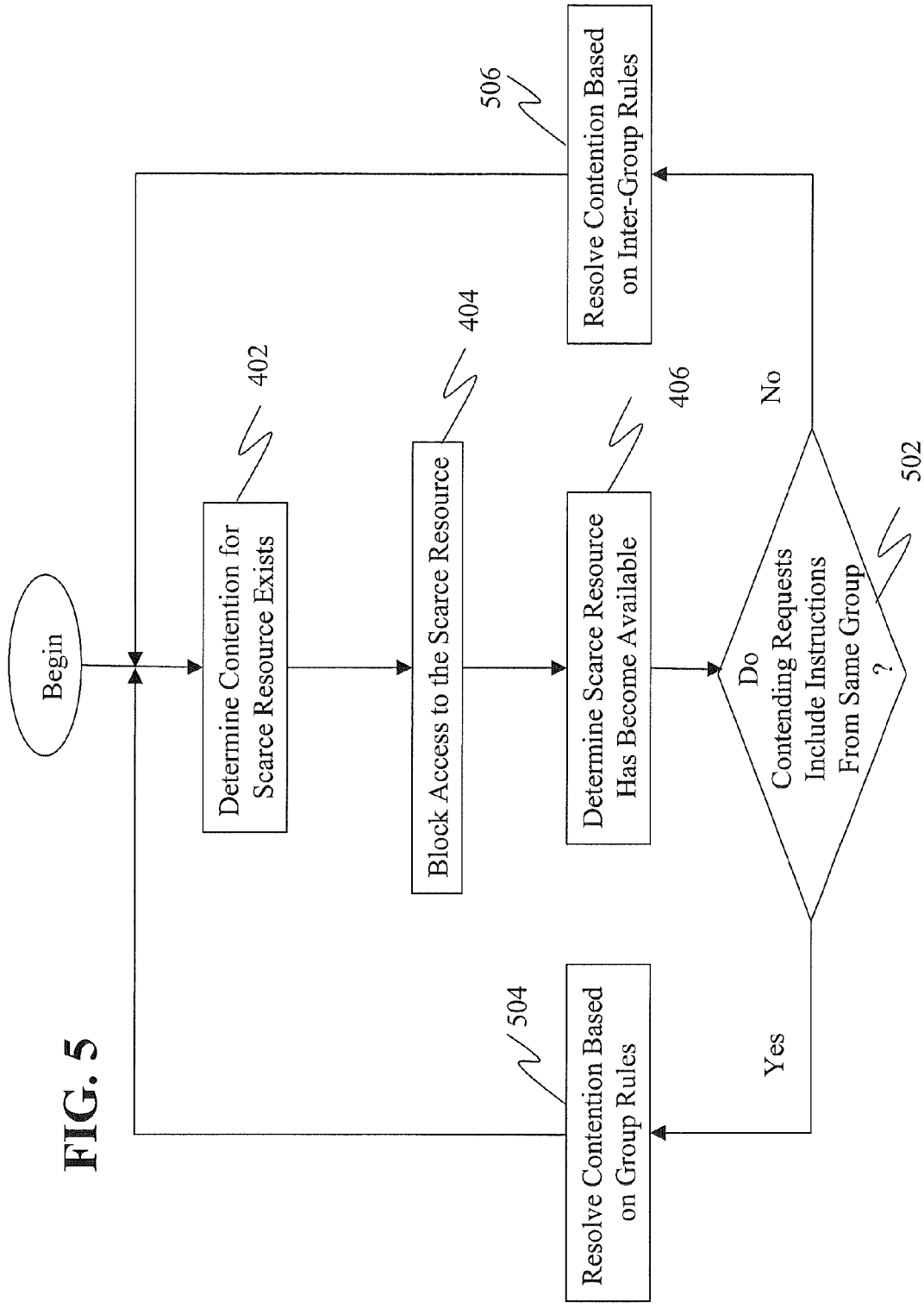
FIG. 5 is a flow chart showing a method of resolving contention between requestors for access to a resource according to another embodiment.

FIG. 5 shows a method according to another embodiment. In this embodiment, step 402, 404 and 406 are the same as in FIG. 4 are not discussed further. In this embodiment it is assumed that instructions that need to use the L4 command queues are divided into three groups based on L4 resource usage and each group has its own independent limit on L4 command queue usage and its own independent fairness logic to ensure equitable access for commands of that type. Accordingly, at a block 402 it is determined if the instructions being presented by the contending command queues are in the same group. If they are, at a block 504 the contention is resolved based on the group rules. In one embodiment, the group rules may have a fixed priority of instructions. In another, the instructions may have their priority varied in a round robin manner. If the instructions are not in the same group, at a block 506, the contention is resolve utilizing inter-group rules. Similar to the group rules, the inter-group rules may have a fixed priority of groups. In another, the groups may have their priority varied in a round robin manner.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. An apparatus for controlling access to a resource, the apparatus comprising:
a shared pipeline configured to communicate with the resource;
a plurality of command queues configured to form instructions for the shared pipeline;
an arbiter coupled between the shared pipeline and the plurality of command queues configured to grant access to the shared pipeline to a one of the plurality of command queues based on a rank priority scheme in a first operating mode;

interface logic coupled to the arbiter and configured to determine that contention for access to the resource exists among the plurality of command queues and to cause the arbiter to grant access to the shared pipeline based on a round robin priority scheme in a second operating mode after it has determined that contention for access no longer exists.

2. The apparatus of claim 1, wherein the resource is a command queue in a cache.

3. The apparatus of claim 1, wherein in the first operating mode the arbiter grants access to the shared pipeline based on a rank of command queue types.

4. The apparatus of claim 1, wherein the interface logic is configured to determine that the resource is fully utilized and to block any further access to the resource.

5. The apparatus of claim 1, wherein the resource is on a different chip than the apparatus.

6. The apparatus of claim 1, wherein the interface logic is implemented in hardware.

7. The apparatus of claim 4, wherein the interface logic is configured to cause the arbiter to operate in the second mode only when contention for the resource exists.

8. A computer implemented method of granting access to a shared pipeline, the method comprising:

operating an arbiter in a first mode according to a rank priority scheme;

determining that contention exists between at least two requestors for access to a resource;

blocking access to the resource;

determining that the resource has become available;

operating the arbiter in a second mode after the resource has become available according to a round robin priority scheme.

9. The method of claim 8, wherein the resource is command queue of a first cache.

10. The method of claim 9, wherein the requestors are command queues in a second cache different than the first cache.

11. The method of claim 10, wherein the first cache and the second cache are on different chips.

12. A computer implemented method of granting access to a shared pipeline, the method comprising:

operating an arbiter in a first mode according to a first priority scheme;

determining that contention exists between at least two requestors presenting requests for access to a resource, the requests including instructions;

blocking access to the resource;

determining that the resource has become available; and determining if the instructions are in a same group and, if so, resolving the contention based on a group contention resolution scheme, otherwise, resolving the contention based on an inter-group contention resolution scheme.

13. The method of claim 12, wherein the resource is command queue of a first cache.

14. The method of claim 13, wherein the requestors are command queues in a second cache different than the first cache.

15. The method of claim 14, wherein the first cache and the second cache are on different chips.

* * * * *